United States Patent [19]

Tabeau

[11] Patent Number: 4,752,094
[45] Date of Patent: Jun. 21, 1988

[54] ROBOT GRIPPER OR HAND DEVICE

[75] Inventor: G. Tabeau, Bayeux, France

[73] Assignee: Societte Industrielle de Basse Normandie, France

[21] Appl. No.: 927,541

[22] Filed: Nov. 4, 1986

[30] Foreign Application Priority Data

Nov. 7, 1985 [FR] France ................... 85 16492

[51] Int. Cl.⁴ .................. B25J 15/08; B25J 19/02
[52] U.S. Cl. ...................... 294/88; 294/106; 294/907; 901/37; 901/46
[58] Field of Search ........... 294/86.4, 88, 106, 115, 294/116, 119.1, 907; 269/32, 33, 227; 901/31, 32, 34, 36–39, 46

[56] References Cited

U.S. PATENT DOCUMENTS

| | | | |
|---|---|---|---|
| 2,679,177 | 5/1954 | Gepfert | 269/33 X |
| 3,384,409 | 5/1968 | Guinot | 294/88 |
| 4,573,727 | 3/1986 | Iikura | 294/106 X |
| 4,591,199 | 5/1986 | Zajac | 294/88 |
| 4,626,014 | 12/1986 | Vredenbregt et al. | 294/106 X |

FOREIGN PATENT DOCUMENTS

| | | | |
|---|---|---|---|
| 212917 | 8/1984 | German Democratic Rep. | 901/37 |
| 224800 | 7/1985 | German Democratic Rep. | 901/39 |
| 2124180 | 2/1984 | United Kingdom | 901/31 |
| 2147268 | 5/1985 | United Kingdom | 294/119.1 |
| 1136935 | 1/1985 | U.S.S.R. | 294/88 |

*Primary Examiner*—Johnny D. Cherry
*Attorney, Agent, or Firm*—Jacobs & Jacobs

[57] ABSTRACT

A robot hand gripping device intended for equipping the end of the wrist or arm of an industrial robot or robotized appliance, comprising grasping members or fingers and hydromechanical controls for spreading the grasping members apart from one another and/or bringing them closer to one another. It is formed by assembling together two identical parts with an intermediate piece between the parts, connectors being provided in the intermediate piece for connecting the two identical parts to at least one drive-energy source, such as compressed air, oil or the like.

9 Claims, 2 Drawing Sheets

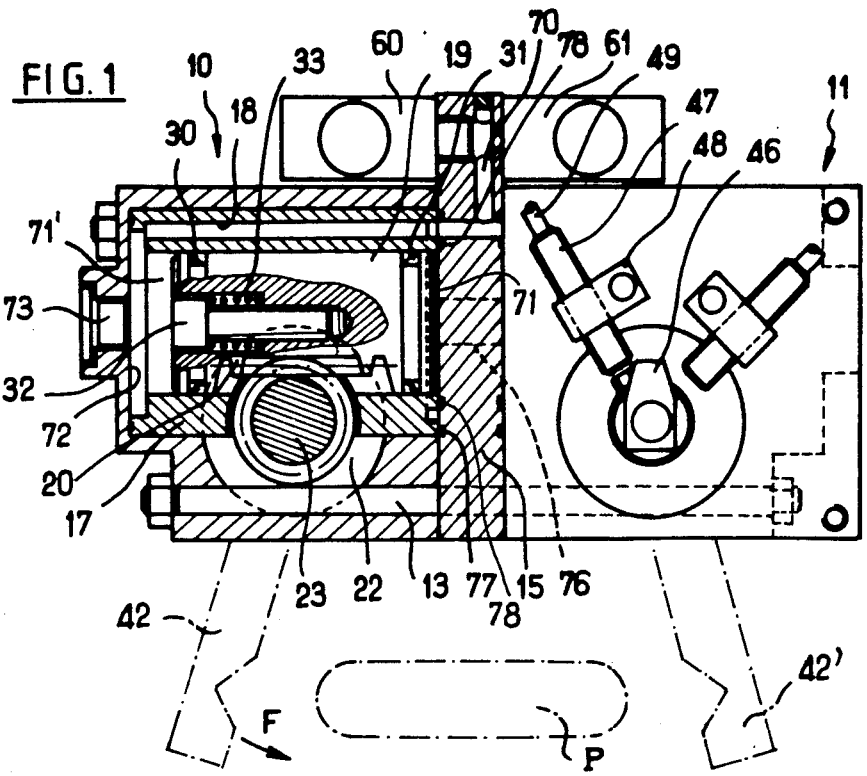

ROBOT GRIPPER OR HAND DEVICE

FIELD OF THE INVENTION

The invention relates to an improved robot hand gripping device.

It is aimed, more particularly, at such a device intended to be interposed between actual grasping members, such as "fingers", and a member which is sometimes called a "wrist" and which is itself connected to an "arm" of an industrial robot.

PRIOR ART

Hands for industrial robots are already known, for example, from WO No. 83/00651 or WO No. 83/00652 or also WO No. 84/00713. These are of a relatively complex general structure and, moreover, are intended to meet a particular requirement, that is to say they offer few possibilities or no possibilities at all for modification and/or adaptation.

SUMMARY OF THE INVENTION

In general terms, one object of the invention is to provide such a robot gripper or hand device, which can easily be adapted to different types of arms or wrists of industrial robots.

Another object of the invention is to provide such a gripper or hand device which can easily be modified and which is thus suitable for making it possible to grasp articles of different sizes and/or shapes with its fingers.

Yet another object of the invention is to provide such a device which has high reliability, but a lower cost than that of the known complex devices.

A hand gripping device according to the invention, intended for forming the end of the wrist or arm of a robot or robotized appliance and which comprises grasping members or "fingers" and means of controlling the movements of spreading the said grasping members apart from one another and/or bringing them closer to one another, is defined in that it is formed by assembling together two identical parts, with an intermediate piece being interposed between the said parts, there being in the said intermediate piece means of connecting the said parts to at least one drive-energy source, such as compressed air, oil or any other suitable fluid.

In a preferred embodiment, each of the said parts comprises a device with a cylinder and with a piston, the piston being subjected to the action of the said driving fluid and carrying a rack interacting with a toothed pinion fixed to a shaft, on which one of the said grasping members is fastened.

In an advantageous embodiment, the angular position of the shaft, to which the pinion is fixed, is determined by the interaction of means, which it carries at one of its ends, with sensors fixed to one of the said parts.

BRIEF DESCRIPTION OF THE DRAWINGS

The invention will be understood better from the following description given by way of example and with reference to the accompanying drawing, in which:

FIG. 1 is a view, partly in section and partly in elevation, of an improved device according to the invention;

FIG. 2 is a plan view of the said device;

DESCRIPTION OF THE PREFERRED EMBODIMENT

A robot hand gripping device according to the invention essentially comprises, according to FIGS. 1 and 2, two identical parts 10 and 11 intended to be connected together by means of three tie rods 12, 13 and 14 (advantageously arranged at the vertices of an equilateral triangle), with an intermediate piece 15 being interposed between them.

Figure 3:
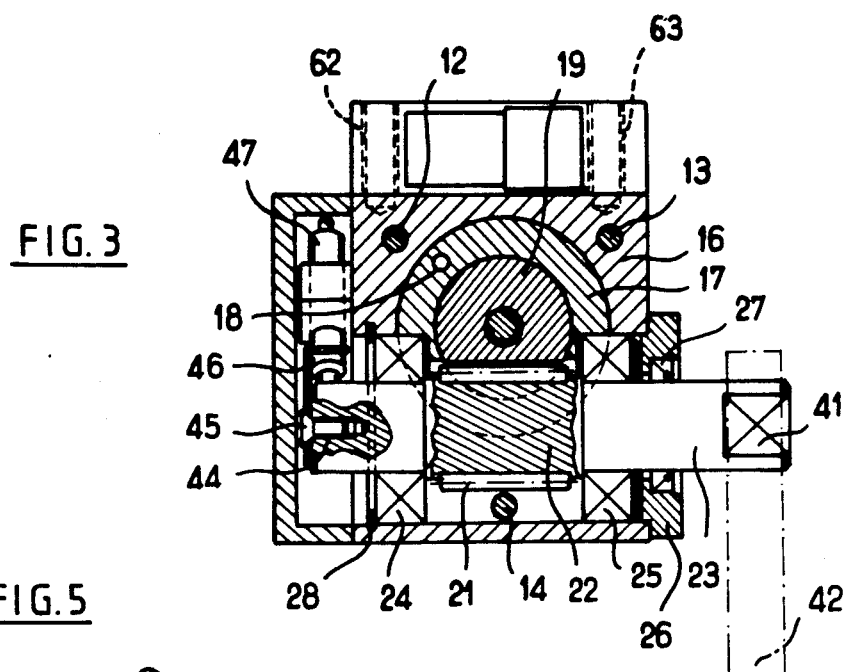
FIG. 3 is a sectional view along the line 3—3 of FIG. 2.

As can be seen in FIGS. 1 and 3, each of the parts 10, 11 comprises a block of general parallelepipedic shape 16, in which is mounted a cylindrical tubular sleeve 17 perforated with a longitudinal bore 18. Mounted slidably in the sleeve 17 is a piston 19 which, between its front end faces, is shaped in the form of a rack 20 meshing with the toothing 21 of a pinion 22 which has an axis at right angles to that of the piston and which is fixed to a shaft 23 mounted rotatably in the block 16 by means of bearings 24 and 25 (FIG. 3). The bearing 24 is held in position by a circlip 28, and the bearing 25 is held in position by a ring 26 with a lip seal 27.

The piston 19, in the vicinity of each of its front end faces, is equipped with lip seals 30 and 31 respectively, and the amount of sliding of the piston can be set by means of a stop 32 having an axial position adjustable relative to the body of the cylinder. Adjustment is carried out by screwing the actuating head of the stop 32 counter to the action of a spring 33 inserted between the bottom of a recess in the piston body and the said actuating head.

Figure 4:
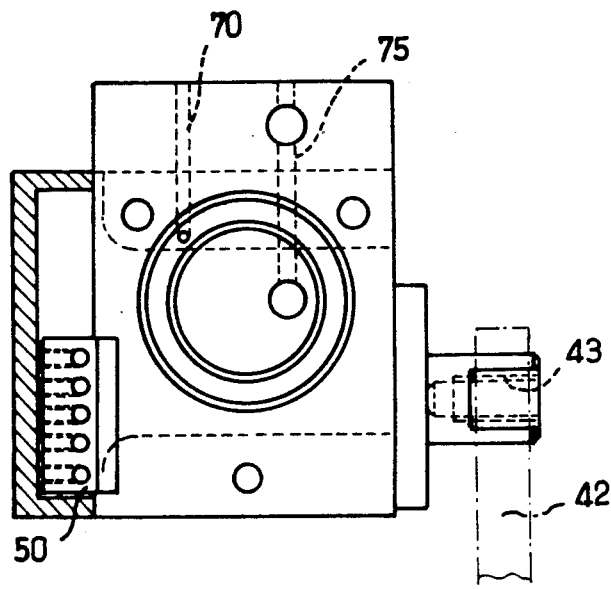
FIG. 4 is a corresponding end view.

The end of the shaft 23 projecting from the block 16 in the vicinity of the ring 26 has two opposite flat portions 40 and 41 for positioning a grasping member or finger 42 which is fixed to the said shaft by screw means (not shown) designed to interact with a tapped blind hole 43 (FIG. 4).

The other end of the shaft 23 is likewise perforated with a tapped blind hole 44 (FIG. 3), into which penetrates a screw 45 for fastening a marker 46 intended to interact with sensors, such as 47, fastened to the block 16 by means of lugs 48, the outputs 49 of the sensors 47 ending at a block 50 (FIG. 4) for connection to control and/or monitoring and/or adjusting means (not shown).

As indicated above, a robot gripper or hand according to the invention is obtained when two identical parts 10 and 11 are assembled together, with an intermediate piece 15 being interposed between them. The latter is in the form of a thick plate (FIGS. 1 to 4), the dimensions of which correspond substantially to those of the blocks composing the parts 10 and 11, but with two connectors 60 and 61 which project relative to the said parts when these are assembled and which are intended for connection to a source of driving fluid, such as compressed air, oil or any other suitable fluid.

The latter is conveyed either via a first bore 70 in the part 15 and the longitudinal bore 18 in the sleeve 17 into a first chamber 71', limited by the inner wall of the sleeve 17, one front end face of the piston 19 and the face 72, closed by a plug 73, of the body 16, or via a second inlet 75 and a longitudinal bore 76 into a second chamber 71 limited by the other front face of the piston, the inner wall of the sleeve 17 and one front face of the intermediate piece 15, sealing being ensured by means of O-rings, such as 77 and 78, inserted between the blocks 10 and 11 and the said intermediate piece 15.

Figure 5:
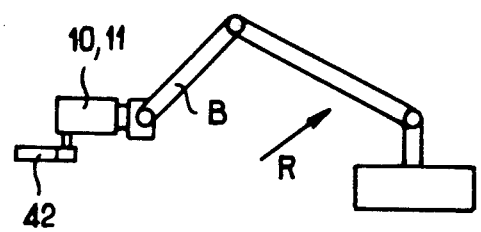
FIG. 5 is a highly diagrammatic view illustrating the use of a device according to the invention.

The latter, which has passages for the tie rods 12, 13 and 14, also possesses tapped blind bores 62 and 63 for fastening the gripper or hand to the arm B of an industrial robot or other robotized applicance, as shown diagrammatically at R in FIG. 5.

The mode of operation of a device according to the invention emerges directly from the foregoing.

When, starting from the state of the fingers shown at 42 and 42' in FIG. 1, it is intended that the hand should grasp an article P, the driving fluid is introduced into the appropriate chambers, such as 71, in the sleeves 17 of each of the parts 10 and 11, in order to cause the pistons 19 to move in the direction driving the pinions 22 in rotation and consequently driving the shafts 23 in the direction indicated by the arrow F (FIG. 1), that is to say the direction in which the free ends of the fingers 42, 42' are brought closer to one another. This movement is continued until the article P is grasped, this hold advantageously being detected by means of the member or members 46 interacting with the sensors 47.

After the article P has been moved by the arm B or the assembly R of the robot and it is intended that the hold be released, the introduction of driving fluid into those chambers, such as 71, mentioned above is interrupted and the fluid is conveyed to the faces of the pistons 19 opposite those previously under consideration. This produces a translational movement of the pistons 19 in the opposite direction to that mentioned above and, as a result of the interaction of the racks 20 and pinions 22, a rotational movement of the shafts 23 in the opposite direction to that described above, that is to say a pivoting of the fingers 42 and 42' which releases the article P, the end of this pivoting movement advantageously being controlled from the sensors 47, with which the members, such as 46, interact.

A device according to the invention can easily be adjusted in terms of the distance between the centers of the finger-carrying shafts, simply by modifying the thickness of the intermediate piece 15, so that a multiplicity of devices with different center distances can be obtained by means of the same parts 10 and 11 which are assembled together, with intermediate pieces 15 of different thicknesses being interposed.

I claim:

1. A robot hand gripping device for attachment to an arm of a robot, said gripping device comprising:
   (A) a first and a second identical part for assembly together;
   (B) an intermediate piece interposed between said first and second parts;
   (C) means for assembling together said first and second identical parts with said intermediate piece interposed therebetween;
   (D) first and second grasping members respectively movably coupled to said first and second identical parts; and
   (E) control means, for grasping members and including a first and a second control assembly respectively located in said first and second identical parts, for controllably moving said grasping members in opposite directions respectively with respect to said first and second identical parts, said control means having
      (i) inputs coupled to at least one drive-energy fluid source, and
      (ii) connecting means in said intermediate piece for connecting said inputs to said first and second control assembly.

2. The device as claimed in claim 1, wherein each control assembly comprises a cylinder and a piston slidably mounted within said cylinder and on which acts fluid from said source, a rack integral with said piston, a shaft, one of said grasping members being fixed onto said shaft, and a pinion, fixed onto said shaft, and interacting with said rack.

3. The device as claimed in claim 2, wherein said rack has built-up portions on an outer surface of the piston.

4. The device as claimed in claim 3, further comprising position detecting means for detecting the angular position of said shaft.

5. The device as claimed in claim 4, wherein said position detecting means comprises marking means integral with said shaft, and sensing means cooperating with said marking means, and fixed onto one of said identical parts.

6. The device as claimed in claim 2, further comprising adjustable stop means within said cylinder, for adjusting the amount of the slide movement of said slidably mounted piston.

7. The device as claimed in claim 1, wherein said assembly means includes tie rods, each of said tie rods extending through and within said first identical part, said intermediate piece and said second identical part.

8. The device as claimed in claim 1, wherein said intermediate piece has a predetermined dimension, and wherein said identical parts are spaced apart by said dimension, and wherein said intermediate piece is interchangeably mounted to and between said identical parts to enable other intermediate pieces of different dimensions to be mounted between said identical parts, for positioning said identical parts apart at a desired distance.

9. A robot hand gripping device, comprising:
   (A) first and second identical parts, each bounding an interior;
   (B) an intermediate piece located between said first and second parts;
   (C) means for interconnecting all said parts and said piece in a mutually stationary relationship;
   (D) first and second grasping members respectively mounted on said first and second parts for turning movement about respective axes that are generally parallel to each other, said grasping members having free end portions; and
   (E) drive means for turning said grasping members relative to said respective first and second parts in opposite directions about said respective axes between non-gripping and gripping positions in which said free end portions are spaced further apart, and closer together, respectively, said drive means including
      (i) a first and a second hydraulic assembly respectvely located in said interior of each of said first and second parts, each assembly having a stationary element stationarily mounted within each part, and a hydraulically displaceable element mounted for movement relative to said stationary element and operatively connected to a respective grasping member, and
      (ii) hydraulic means including a hydraulic source having a supply of a hydraulic fluid, and means extending through said intermediate piece to each of said parts for conveying the hydraulic fluid to and away from a respective hydraulic assembly.

* * * * *